US012789211B2

(12) United States Patent
Koide et al.

(10) Patent No.: US 12,789,211 B2
(45) Date of Patent: Nov. 10, 2026

(54) COATING METHOD AND COATING DEVICE

(71) Applicant: KYOCERA Corporation, Kyoto (JP)

(72) Inventors: Shohei Koide, Kirishima (JP); Daisuke Hozumi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/852,485

(22) PCT Filed: Mar. 28, 2023

(86) PCT No.: PCT/JP2023/012554

§ 371 (c)(1),
(2) Date: Sep. 29, 2024

(87) PCT Pub. No.: WO2023/190533

PCT Pub. Date: Oct. 5, 2023

(65) Prior Publication Data

US 2025/0222481 A1 Jul. 10, 2025

(30) Foreign Application Priority Data

Mar. 31, 2022 (JP) ................................. 2022-060519

(51) Int. Cl.
*B05B 12/14* (2006.01)
*B05B 15/20* (2018.01)

(52) U.S. Cl.
CPC .......... *B05B 12/1418* (2013.01); *B05B 15/20* (2018.02)

(58) Field of Classification Search
CPC ..... B05B 12/1418; B05B 12/04; B05B 15/20; B05B 15/50; B05B 13/002; B05B 13/0433; B05D 5/065; B05D 7/14; B05D 2490/60; B05D 1/26; B41J 3/4073
See application file for complete search history.

(56) References Cited

U.S. PATENT DOCUMENTS

| | | | | |
|---|---|---|---|---|
| 2008/0309698 | A1* | 12/2008 | Nakano | B05B 12/084 347/14 |
| 2017/0252765 | A1 | 9/2017 | Medard et al. | |
| 2020/0331023 | A1 | 10/2020 | Chouan et al. | |
| 2022/0219184 | A1 | 7/2022 | Büstgens | |
| 2022/0274129 | A1 | 9/2022 | Hozumi et al. | |
| 2024/0109096 | A1 | 4/2024 | Hozumi et al. | |

FOREIGN PATENT DOCUMENTS

| | | | | | |
|---|---|---|---|---|---|
| DE | 102017118442 | A1 | * | 2/2019 | B41J 2/2114 |
| JP | H08001060 | A | | 1/1996 | |
| JP | 2004167772 | A | * | 6/2004 | |
| JP | 2005-178145 | A | | 7/2005 | |
| JP | 2005305241 | A | * | 11/2005 | |
| JP | 2017192932 | A | * | 10/2017 | B41J 2/2054 |
| JP | 2021-030520 | A | | 3/2021 | |
| WO | 2018092439 | A1 | | 5/2018 | |
| WO | 2020244692 | A1 | | 12/2020 | |
| WO | 2021020577 | A1 | | 2/2021 | |
| WO | 2021039292 | A1 | | 3/2021 | |

* cited by examiner

*Primary Examiner* — William P Fletcher, III
(74) *Attorney, Agent, or Firm* — HAUPTMAN HAM, LLP

(57) ABSTRACT

Provided is a coating method for coating a coating region of a to-be-coated surface by using a head including a plurality of nozzles configured to discharge a liquid. The coating method includes coating the coating region in a first mode while moving the head in a direction along an edge of the coating region and coating the coating region in a second mode having a higher discharge rate than that of the first mode. A first region including at least part of the edge is coated in the first mode.

14 Claims, 15 Drawing Sheets

COATING METHOD AND COATING DEVICE

CROSS-REFERENCE TO RELATED APPLICATIONS

This application is national stage application of International Application No. PCT/JP2023/012554, filed on Mar. 28, 2023, which designates the United States, and which claims the benefit of priority from Japanese Patent Application No. 2022-060519, filed on Mar. 31, 2022.

TECHNICAL FIELD

Embodiments of the disclosure relate to a coating method and a coating device.

BACKGROUND OF INVENTION

A known coating device includes a coating device using an inkjet method. A head for discharging a coating material is mounted on such a coating device of an inkjet method.

CITATION LIST

Patent Literature

Patent Document 1: WO 2018/092439
Patent Document 2: JP 2005-178145 A

SUMMARY

A coating method according to an aspect of an embodiment is for coating a coating region of a to-be-coated surface by using a head including a plurality of nozzles configured to discharge a liquid. The coating method includes coating the coating region in a first mode while moving the head in a direction along an edge of the coating region and coating the coating region in a second mode having a higher discharge rate than that of the first mode. A first region including at least part of the edge is coated in the first mode.

A coating device according to an aspect of an embodiment coats a coating region. The coating device includes a head including a plurality of nozzles configured to discharge a liquid and a controller configured to control discharge of the liquid from the plurality of nozzles. The coating device has a first mode of coating the coating region while moving the head in a direction along an edge of the coating region and a second mode having a higher discharge rate than that of the first mode. The controller controls to coat a first region including at least part of the edge in the first mode.

DESCRIPTION OF EMBODIMENTS

The coating device described above has room for further improvement in enhancing a coating quality. Then, provision of a coating method and a coating device that can improve a coating quality are expected.

Embodiments of a coating method and a coating device disclosed in the present application will be described in detail below with reference to the accompanying drawings. Note that this invention is not limited by the following embodiments. Note that the drawings are schematic and that the dimensional relationships between elements, the proportions of the elements, and the like may differ from the actual ones. There may be differences between the drawings in terms of dimensional relationships, proportions, and the like.

In the following embodiments, expressions such as "constant", "orthogonal", "perpendicular", and "parallel" may be used, but these expressions do not mean exactly "constant", "orthogonal", "perpendicular", and "parallel". That is, it is assumed that the above expressions allow for deviations in manufacturing accuracy, installation accuracy, or the like.

Embodiments can be appropriately combined so as not to contradict each other in terms of processing content. In the following embodiments, the same portions are denoted by the same reference signs, and redundant explanations are omitted.

Embodiment

Configuration of Coating Device

Figure 1:
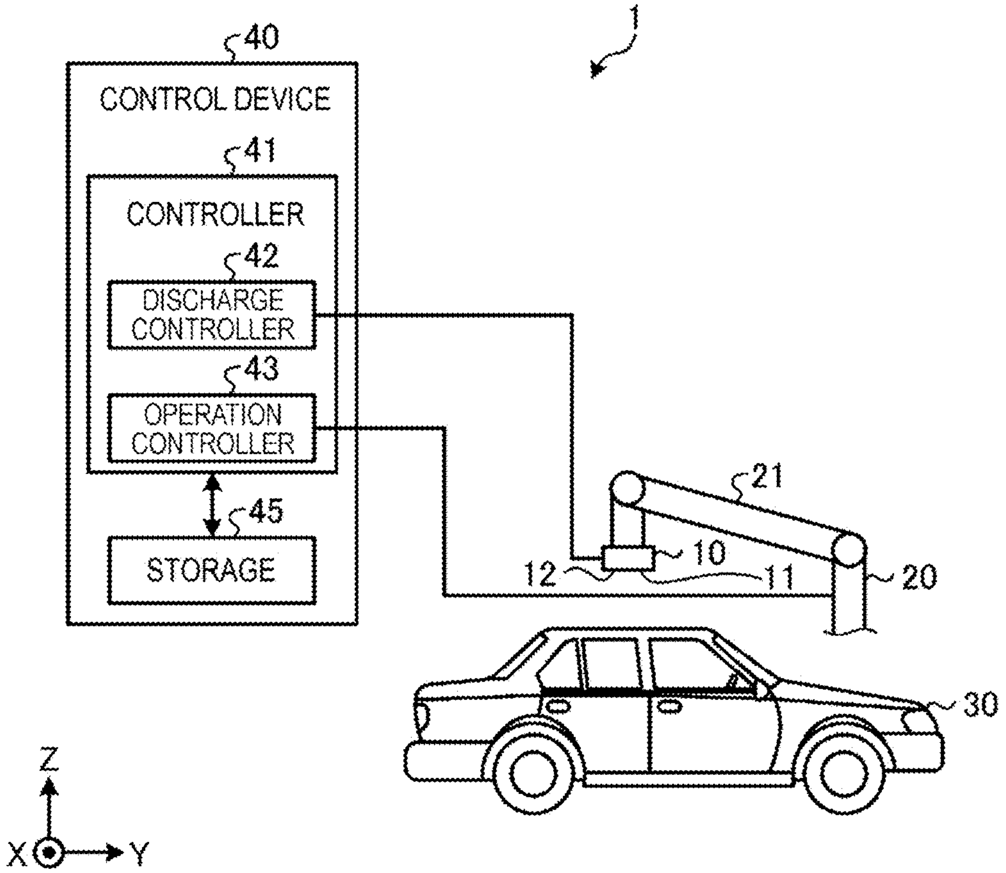
FIG. 1 is an explanatory view of a coating device according to an embodiment.

First, an overview of a coating device according to an embodiment will be described with reference to FIG. 1. FIG. 1 is an explanatory view of the coating device according to the embodiment. Note that, for the sake of clarity, FIG. 1 illustrates a three-dimensional orthogonal coordinate system including a Z axis in which a vertically upward direction is a positive direction and a vertically downward direction is a negative direction. Such an orthogonal coordinate system may also be presented in other drawings used in the description below.

As illustrated in FIG. 1, a coating device 1 includes a head 10, a robot 20, and a control device 40. The head 10 can use, for example, an inkjet head of a valve type, a piezo type, or a thermal type. When a piezo type or thermal type inkjet head is used as the head 10, high resolution is easily realized.

The head 10 is fixed to the robot 20. The head 10 moves according to the operation of the robot 20 controlled by the control device 40. The head 10 includes a plurality of nozzles 11. A surface on which the plurality of nozzles 11 are positioned is referred to as a nozzle surface 12.

The head 10 coats a to-be-coated object 30 by depositing a liquid discharged from the plurality of nozzles 11 positioned on the nozzle surface 12 onto a surface of the to-be-coated object 30 facing the nozzle surface 12.

The head 10 is supplied with the liquid from a tank (not illustrated). The head 10 discharges the liquid supplied from the tank. The liquid is a mixture including a volatile component and a nonvolatile component, and has fluidity. Note that the tank may be a reservoir (not illustrated) accommodated in the head 10.

The volatile component is, for example, water, an organic solvent, or alcohol and adjusts physical properties of the liquid, such as viscosity and surface tension, for example. The nonvolatile component includes, for example, a pigment, a resin material, and an additive. The pigment includes one or more colored pigments used depending on the desired coating color. The resin material adheres to the to-be-coated object 30 and forms a film. The additive is a functional material that is added for purposes of weather resistance, for example. Such a nonvolatile component may be dissolved in the volatile component or may be dispersed without being dissolved. Thus, the liquid discharged from the nozzles 11 is a coating material prepared so as to express a desired coating color by mixing a plurality of components.

The robot 20 holds the head 10. The robot 20 is, for example, a six-axis articulated robot. The robot 20 may be, for example, a vertical articulated robot or a horizontal articulated robot. The robot 20 includes a plurality of arms 21, and the head 10 is fixed to a front end of each of the arms 21. The robot 20 is fixed to, for example, a floor, a wall, or a ceiling. Note that, as long as the held head 10 can be moved properly, the degree of freedom of the arms 21 included in the robot 20 is not limited.

The control device 40 controls the coating device 1. The control device 40 includes a controller 41 that controls the coating device 1, and a storage 45. The controller 41 includes a discharge controller 42 and an operation controller 43.

The controller 41 includes a computer or various circuits including, for example, a central processing unit (CPU), a read only memory (ROM), a random access memory (RAM), a hard desk drive (HDD), and an input/output port. The CPU of such a computer functions as the controller 41 by, for example, reading and executing a program stored in the ROM. The controller 41 may also be constituted by hardware such as an application specific integrated circuit (ASIC) or a field programmable gate array (FPGA).

The discharge controller 42 controls the head 10 on the basis of configuration information stored in the storage 45, and discharges the liquid from the plurality of nozzles 11 toward the to-be-coated object 30. The operation controller 43 controls operations of the plurality of arms 21 on the basis of configuration information stored in the storage 45, and controls movement of the head 10 via the arms 21. A distance between the head 10 and the to-be-coated object 30 is maintained at, for example, about from 0.5 mm to 20 mm. Note that the detailed movement of the head 10 including the discharge of the liquid will be described below.

The storage 45 corresponds to, for example, the ROM and the HDD. The ROM and the HDD can store the configuration information for various controls in the control device 40. The storage 45 stores information related to discharge control of the coating material by the head 10. The storage 45 stores information related to the operation control of the plurality of arms 21. Note that the storage 45 may store data input by an instruction operation of a user using a terminal device (not illustrated) as instruction data for operating the robot 20. The controller 41 may also obtain the configuration information via another computer or portable storage medium connected by a wired or wireless network.

The to-be-coated object 30 is, for example, a vehicle body. The to-be-coated object 30 is placed on a conveying device (not illustrated) and is conveyed in and out. The coating device 1 according to the embodiment coats the to-be-coated object 30 in a state in which the conveying device is stopped. Note that the coating device 1 may coat the to-be-coated object 30 while the to-be-coated object 30 is being repeatedly conveyed and stopped, or may coat the to-be-coated object 30 while the to-be-coated object 30 is being conveyed.

Figure 2:
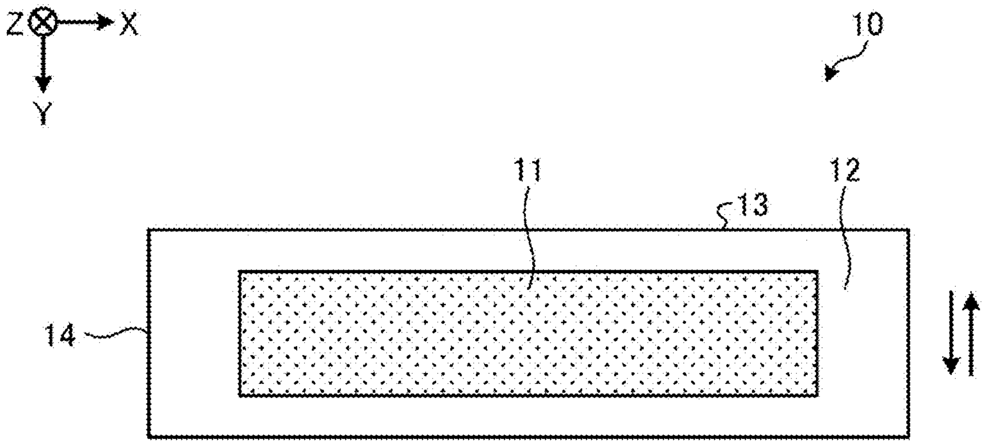
FIG. 2 is a plan view of a head of the coating device according to the embodiment, as viewed from a nozzle surface side.

FIG. 2 is a plan view of the head of the coating device according to the embodiment, as viewed from a nozzle surface side. The head 10 has a substantially rectangular shape in plan view. The nozzle surface 12 includes a first side 13 along a length direction of the head 10 and a second side 14 along a width direction of the head 10. The nozzles 11 are arrayed in a column direction along the first side 13 and in a row direction intersecting the column direction. The head 10 discharges the liquid while moving in a direction along the second side 14, that is, in the example illustrated in FIG. 2, in a Y axis positive direction or a Y axis negative direction, and coats the to-be-coated object 30.

Figure 3:
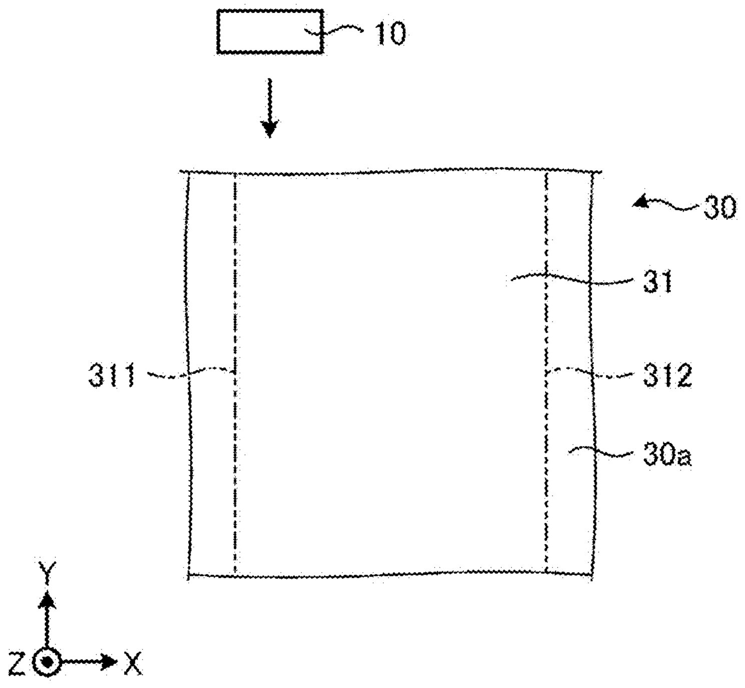
FIG. 3 is a plan view illustrating a schematic configuration of a to-be-coated surface.

FIG. 3 is a plan view illustrating a schematic configuration of the to-be-coated object. As illustrated in FIG. 3, the to-be-coated object 30 includes a to-be-coated surface 30*a*. The head 10 coats a predetermined coating region 31 of the to-be-coated surface 30*a*.

Figure 4:
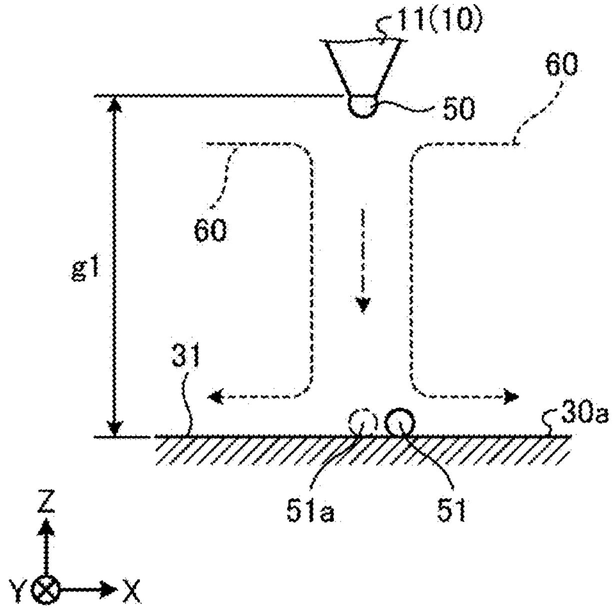
FIG. 4 is a view for explaining a state up until a discharged liquid lands.

FIG. 4 is a view for explaining a state up until the discharged liquid lands. As illustrated in FIG. 4, a liquid 50 discharged from the nozzle 11 of the head 10 lands as a droplet 51 on the coating region 31 of the to-be-coated surface 30*a*. At this time, when affected by an airflow 60 before landing, the liquid 50 discharged from the nozzle 11 may deviate in position immediately below the nozzle 11. Such an effect of the airflow 60 is significant when, for example, a gap g1 between the head 10 and the to-be-coated surface 30*a* is 5 mm or greater.

When the liquid 50 discharged from the nozzles 11 is affected by the airflow 60 and, for example, a region including edges 311 and 312 of the coating region 31 illustrated in FIG. 3 is coated using the head 10 moving in a Y axis direction, the landing of the droplets 51 for coating the edges 311 and 312 may vary, deteriorating the coating quality. Specifically, for example, when a straightness of the edges 311 and 312 is disturbed or the droplets 51 land outside of the coating region 31, the coating quality is likely to deteriorate. Such deterioration of the coating quality is significant when, for example, the straightness is 70 μm or greater, and further 100 μm or greater. Here, the straightness refers to a distance from a virtual droplet 51*a* positioned immediately below the nozzle 11 illustrated in FIG. 4 to the droplet 51 actually landed.

Then, the coating device 1 according to the embodiment performs control for making a discharge rate of the liquid 50 discharged from the nozzles 11 different between when the edges 311 and 312 of the coating region 31 are coated and when the other portion is coated. Specifically, a first region including the edges 311 and 312 of the coating region 31 is coated in a first mode, and a second region not including the edges 311 and 312 is coated in a second mode having a higher discharge rate than that of the first mode. Thus, the edges 311 and 312 of the coating region 31 are sharp and the appearance is improved. Accordingly, according to the coating device 1 according to the embodiment, the coating quality can be improved.

Coating Method

First Embodiment

Figure 5:
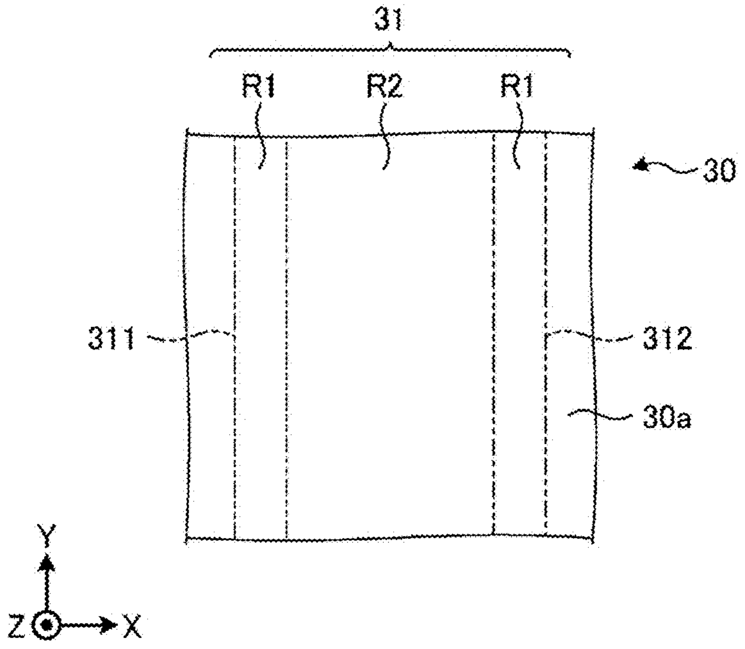
FIG. 5 is a plan view illustrating an example of a first region and a second region of a coating region coated by a coating method according to a first embodiment.
Figure 6:
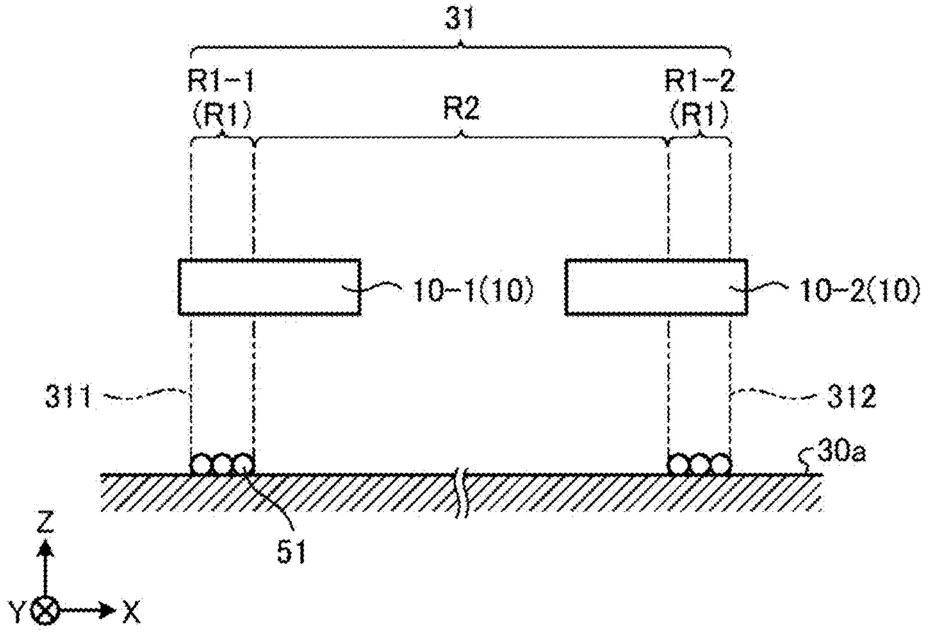
FIG. 6 is an explanatory view illustrating an example of a first mode of the coating device.

A coating method executed by the coating device 1 according to an embodiment will be described with reference to FIGS. 5 and 6. FIG. 5 is a plan view illustrating an example of the first region and the second region of the coating region coated by the coating method according to a first embodiment. FIG. 6 is an explanatory view illustrating an example of the first mode of the coating device.

As described above, the coating device 1 coats the first region R1 including the edges 311 and 312 of the coating region 31 in the first mode. Here, the first mode is a mode in which coating is performed by discharging the liquid 50 by using some nozzles 11 of the plurality of nozzles 11 included in the head 10 and without discharging the liquid 50 from the remaining nozzles 11. Specifically, coating can be performed with a discharge rate of the first mode set from 1% to 10%, further from 4% to 6%. When the discharge rate is less than 1%, the edges 311 and 312 of the coating region 31 may not be coatable in an attractive manner, for example. When the discharge rate exceeds 10%, the liquid 50 discharged from the nozzles 11 is likely to be affected by the airflow 60, for example, deteriorating the coating quality. The discharge rate refers to the ratio of the nozzles 11 used for coating among the plurality of nozzles 11 illustrated in FIG. 2. For example, the discharge rate when the liquid 50 is discharged using five rows of the nozzles 11 out of 100 rows of the nozzles 11 is 5%. Note that the discharge/non-discharge of the liquid 50 from the plurality of nozzles 11 may be controlled in units of columns or may be controlled individually, for example. The nozzles 11 that discharge the liquid 50 may be continuous or discontinuous in the column direction and/or the row direction. Note that the edges 311 and 312 are formed by the droplets 51 discharged to outermost sides of the coating region 31, with the discharge being from the nozzles 11 positioned at the outermost sides of the coating region 31 among the nozzles 11 of the head 10. The edges 311 and 312 may be formed by the droplets 51 discharged from, among the nozzles 11 of the head 10, the 16th nozzle 11, for example, which is 1% of the total from the nozzles 11 positioned at the outermost sides of the coating region 31.

A region R1-1 of the first region R1 is a region where the droplets 51 land when the coating region 31 including the edge 311 of the coating region 31 is coated at a predetermined discharge rate using the head 10. Similarly, a region R1-2 of the first region R1 is a region where the droplets 51 land when the coating region 31 including the edge 312 of the coating region 31 is coated at a predetermined discharge rate using the head 10.

The second region R2 is a region of the coating region 31 that does not include the edges 311 and 312. The second region R2 according to the present embodiment is a region other than the first region R1. The head 10 coats the second region R2 in the second mode having a higher discharge rate than that of the first mode. Specifically, coating can be performed by setting the discharge rate of the second mode to 90% or greater, further 95% or greater. The discharge rate of the second mode may be higher than that of the first mode, and may be 50% or greater.

As described above, coating the first region R1 including the edges 311 and 312 of the coating region 31 in the first mode in which the discharge rate is suppressed can reduce the effect of the airflow 60 on the liquid 50 discharged from the nozzles 11, improving the coating quality.

On the other hand, the second region R2 not including the edges 311 and 312 is coated in the second mode having a higher discharge rate than that of the first mode, making a reduction in coating efficiency less likely.

Note that various parameters used for control in the first mode and the second mode described above can be stored in, for example, the storage 45 of the control device 40. A coating order of the coating region 31 in the control executed by the controller 41 is not limited, and coating may be performed in any order. For example, the controller 41 may control to coat the first region R1→the second region R2 in this order, or may control to coat the second region R2→the first region R1 in this order. Coating may be performed in the order of the region R1-1→the second region R2→the region R1-2.

In the first mode, the controller 41 may input a predetermined control signal to the liquid 50 in the nozzles 11 from which the liquid 50 is not discharged to vibrate the liquid 50. This can make the nozzles 11 unused in the first mode less likely to get clogged.

In the first mode, so-called spitting may be performed in which the liquid 50 positioned in the nozzles 11 not corresponding to the first region R1 is discharged. Here, the spitting includes, for example, discharging a small amount of the liquid 50 to the second region R2. Thus, the nozzles 11 not used in the first mode are less likely to get clogged, and the coating quality of the second region R2 can be maintained.

The first region R1 and the second region R2 may be coated at the same speed or may be coated at different speeds. For example, when the coating region 31 is coated in the order of the first region R1→the second region R2, the first region R1 may be coated at the same speed as the second region R2. This can reduce failure caused by a difference in timing between the discharge speed from the nozzles 11 and the coating speed, for example.

Second Embodiment

Figure 7:
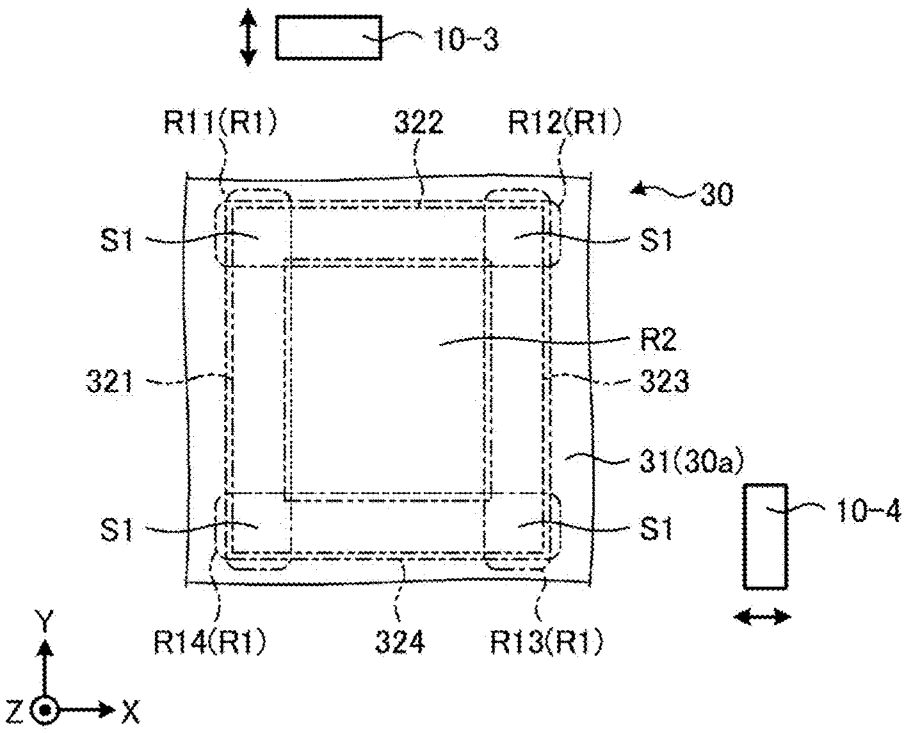
FIG. 7 is a plan view illustrating an example of the coating region coated by the coating method according to a second embodiment.

FIG. 7 is a plan view illustrating an example of the coating region coated by the coating method according to a second embodiment. The to-be-coated object 30 illustrated in FIG. 7 includes the coating region 31 having a rectangular shape on the to-be-coated surface 30*a*. The coating region 31 includes edges 321 and 323 extending in the Y axis direction and edges 322, 324 extending in an X axis direction.

The coating device 1 coats the first region R1 including the edges 321 to 324 of the coating region 31 in the first mode. The first region R1 includes a region R11 including the edge 321, a region R12 including the edge 322, a region R13 including the edge 323, and a region R14 including the edge 324. The regions R11, R13 are coated by a head 10-3 moving in the Y axis direction. The regions R12, R14 are coated by a head 10-4 moving in the X axis direction.

The first region R1 according to the present embodiment may include a first overlapping region S1 that is an overlapping region to be overlappedly coated in the first mode. The first overlapping region S1 may be coated multiple times while moving the head 10 in different directions.

On the other hand, the second region R2 not including the edges 321 to 324 is coated in the second mode having a higher discharge rate than that of the first mode. Thus, the coating efficiency is less likely to be reduced. Note that the second region R2 may be coated by the head 10-3 moving in the Y axis direction or may be coated by the head 10-4 moving in the X axis direction.

Note that the order in which the coating region 31 is coated by control of the controller 41 is not limited, and the controller 41 may control to coat the coating region 31 in any order. For example, the controller 41 may control to coat the first region R1→the second region R2 in this order, or may control to coat the second region R2→the first region R1 in this order. The controller 41 may control to coat the first region R1 in the order of, for example, the region R11→the region R12→the region R13→the region R14, or in the order of the region R11→the region R13→the region R12→the region R14. When the coating region 31 is smaller than a width of the head 10, the controller 41 may control to simultaneously coat the regions R11, R13 or may control to simultaneously coat the regions R12, R14 facing each other, for example.

The first region R1 and the second region R2 may be coated at different speeds. For example, when the coating region 31 is coated in the order of the first region R1→the second region R2, the first region R1 may be coated at a speed faster than that of the second region R2. Thus, for example, when the first region R1 is coated in the first mode, a failure in which the liquid 50 adheres outside of the coating region 31 positioned in the vicinity of the edges 321 to 324, deteriorating the appearance of the edges 321 to 324, can be reduced. The regions R11 to R14 may be coated at the same speed or may be coated at different speeds.

Third Embodiment

Figure 8:
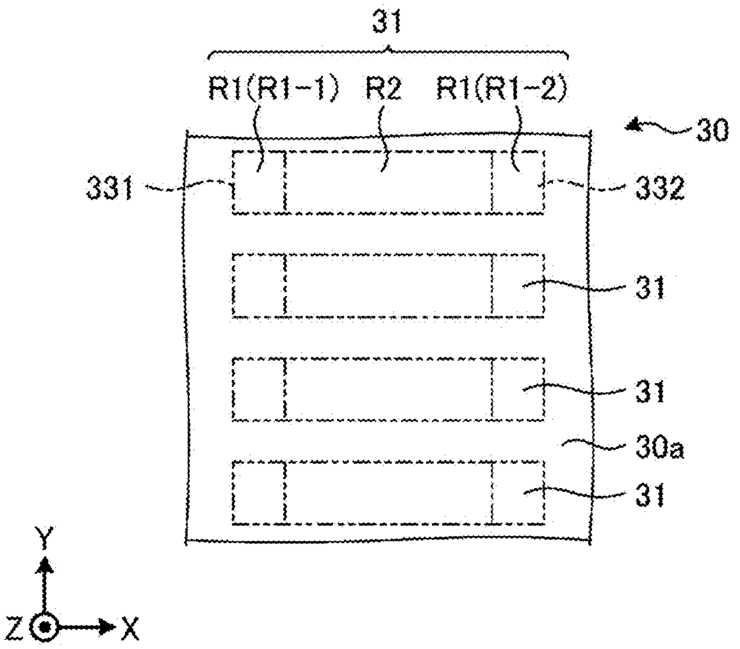
FIG. 8 is a plan view illustrating an example of the coating region coated by the coating method according to a third embodiment.

FIG. 8 is a plan view illustrating an example of the coating region coated by the coating method according to a third embodiment. The to-be-coated object 30 illustrated in FIG. 8 includes a plurality of the coating regions 31 aligned in the Y axis direction on the to-be-coated surface 30*a*.

The coating device 1 coats the region R1-1 of the first region R1 including an edge 331 of the coating region 31 in the first mode. The region R1-1 included in the plurality of coating regions 31 is coated by the head 10 moving in the Y axis direction.

The coating device 1 coats the region R1-2 of the first region R1 including an edge 332 of the coating region 31 in the first mode. The region R1-2 included in the plurality of coating regions 31 is coated by the head 10 moving in the Y axis direction.

The coating device 1 coats the second region R2 of the coating region 31 that does not include the edges 331, 332 in the second mode. The second region R2 included in the plurality of coating regions 31 is coated by the head 10 moving in the Y axis direction.

In this way, the plurality of coating regions 31 are sequentially coated by the operation of the head 10 in one direction, improving the coating efficiency.

Fourth Embodiment

Figure 9:
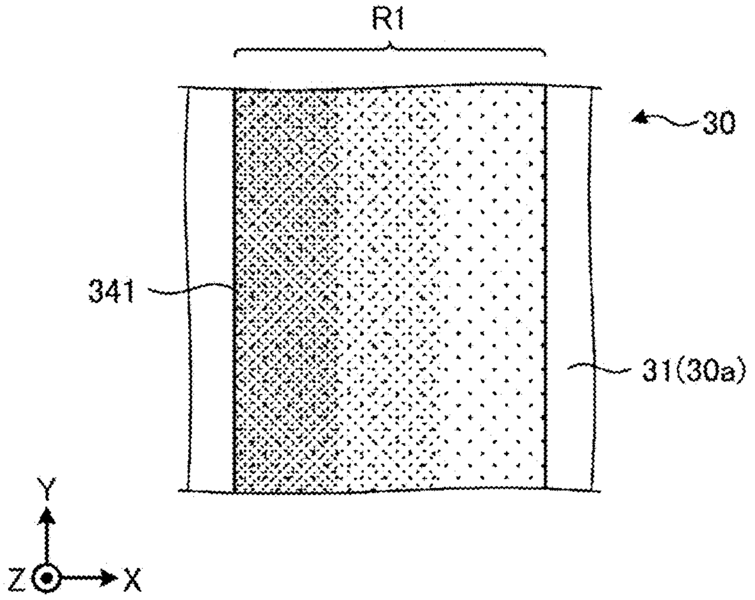
FIG. 9 is a plan view illustrating an example of the coating region coated by the coating method according to a fourth embodiment.

FIG. 9 is a plan view illustrating an example of the coating region coated by the coating method according to a fourth embodiment. The to-be-coated object 30 illustrated in FIG. 9 includes the coating region 31 including the first region R1 on the to-be-coated surface 30*a*. The first region R1 includes an edge 341 extending in the Y axis direction. Note that, in FIG. 9, illustration of the second region R2 is omitted.

The first region R1 is coated in the first mode while moving the head 10 in a direction along the edge 341. At this time, the first region R1 may be coated by gradation coating having brightness increasing with distance from the edge 341. With the brightness being increased as the distance from the edge 341 increases, a boundary between the droplets 51 applied in the first mode and the droplets 51 applied in the second mode is less visible, further improving the coating quality.

Fifth Embodiment

Figure 10:
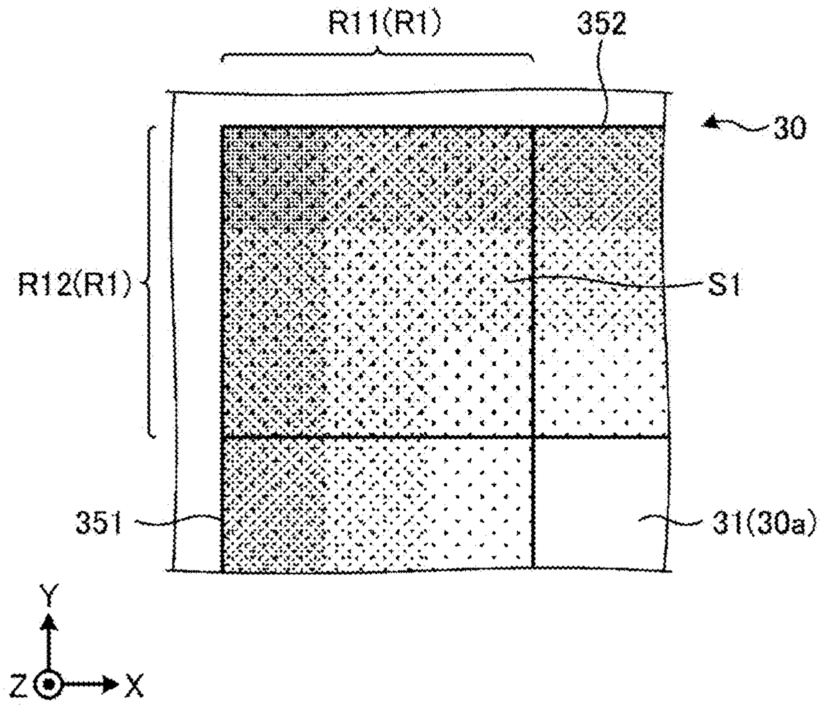
FIG. 10 is a plan view illustrating an example of the coating region coated by the coating method according to a fifth embodiment.

FIG. 10 is a plan view illustrating an example of the coating region coated by the coating method according to a fifth embodiment. The to-be-coated object 30 illustrated in FIG. 10 includes the coating region 31 including the first region R1 on the to-be-coated surface 30*a*. The first region R1 includes the region R11 including an edge 351 extending in the Y axis direction and the region R12 including an edge 352 extending in the X axis direction. Note that, in FIG. 10, illustration of the second region R2 is omitted.

The region R11 is coated in the first mode by the head 10 moving in a direction along the edge 351. The region R12 is coated in the first mode by the head 10 moving in a direction along the edge 352. The region R11 and/or the region R12 may be coated by gradation coating having brightness increasing with distance from the edge 351 side and/or the edge 352 side. Thus, the number of droplets 51 that land on the first overlapping region S1 coated multiple times in the first mode can be appropriately reduced, improving the coating quality.

Sixth Embodiment

Figure 11:
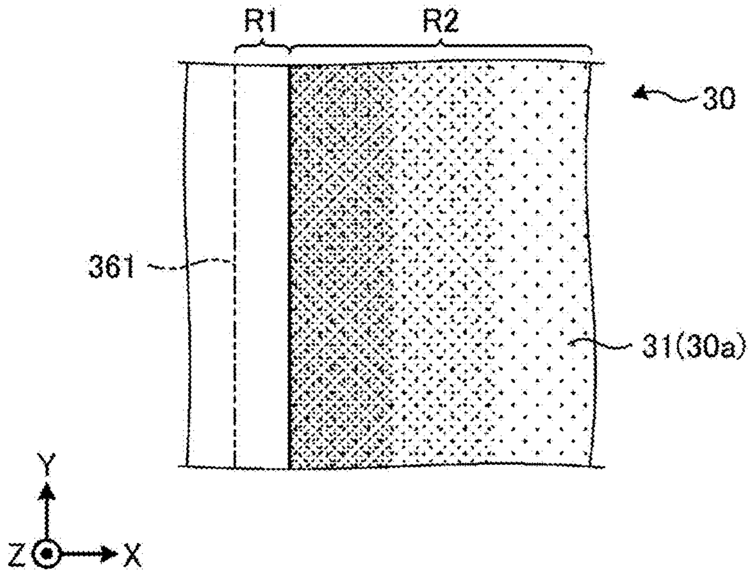
FIG. 11 is a plan view illustrating an example of the coating region coated by the coating method according to a sixth embodiment.

FIG. 11 is a plan view illustrating an example of the coating region coated by the coating method according to a sixth embodiment. The to-be-coated object 30 illustrated in FIG. 11 includes the coating region 31 including the first region R1 and the second region R2 on the to-be-coated surface 30*a*. The first region R1 includes an edge 361 extending in the Y axis direction.

The second region R2 is coated in the second mode by the head 10 moving in a direction along the edge 361. At this time, the second region R2 may be coated by gradation coating having brightness increasing with distance from the edge 361. With the brightness being increased as the distance from the edge 361 increases, a boundary between the first region R1 to be coated in the first mode and the second region R2 to be coated in the second mode is less visible, further improving the coating quality.

Seventh Embodiment

Figure 12:
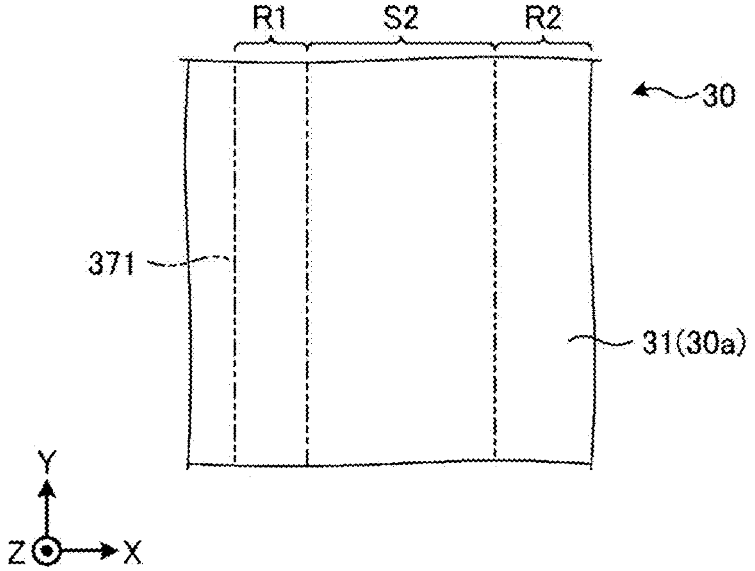
FIG. 12 is a plan view illustrating an example of the coating region coated by the coating method according to a seventh embodiment.

FIG. 12 is a plan view illustrating an example of the coating region coated by the coating method according to a seventh embodiment. The to-be-coated object 30 illustrated in FIG. 12 includes the coating region 31 including the first region R1, the second region R2, and a second overlapping region S2 on the to-be-coated surface 30*a*.

The first region R1 includes an edge 371 extending in the Y axis direction. The first region R1 is coated in the first mode while moving the head 10 in a direction along the edge 371. The second region R2 is coated in the second mode having a higher discharge rate than that of the first mode while moving the head 10 in the direction along the edge 371.

The second overlapping region S2 is a region to be overlappedly coated when coated in the first mode and when coated in the second mode. The second overlapping region S2 is thus positioned between the first region R1 and the second region R2, making the boundary between the first region R1 to be coated in the first mode and the second region R2 to be coated in the second mode even less visible, thereby further improving the coating quality. Note that, in the example illustrated in FIG. 12, an example in which the first region R1 and the second region R2 are coated in the same direction is described. However, the directions are not limited thereto and, for example, the second region R2 may be coated while moving the head 10 in a direction intersecting the edge 371.

Eighth to Tenth Embodiments

Figure 13:
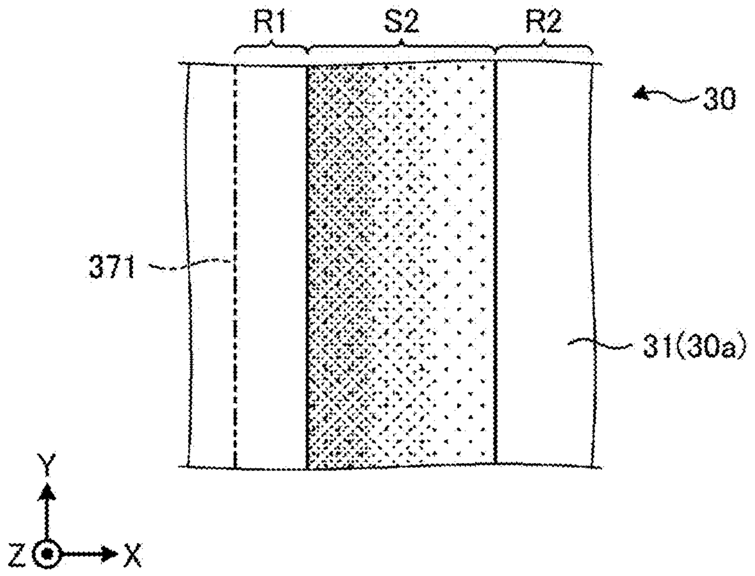
FIG. 13 is a plan view illustrating an example of the coating region coated by the coating method according to an eighth embodiment.
Figure 14:
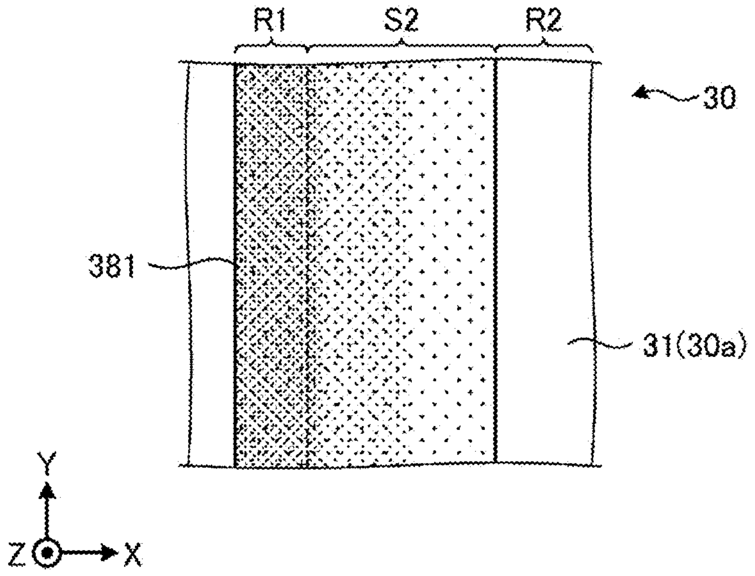
FIG. 14 is a plan view illustrating an example of the coating region coated by the coating method according to a ninth embodiment.
Figure 15:
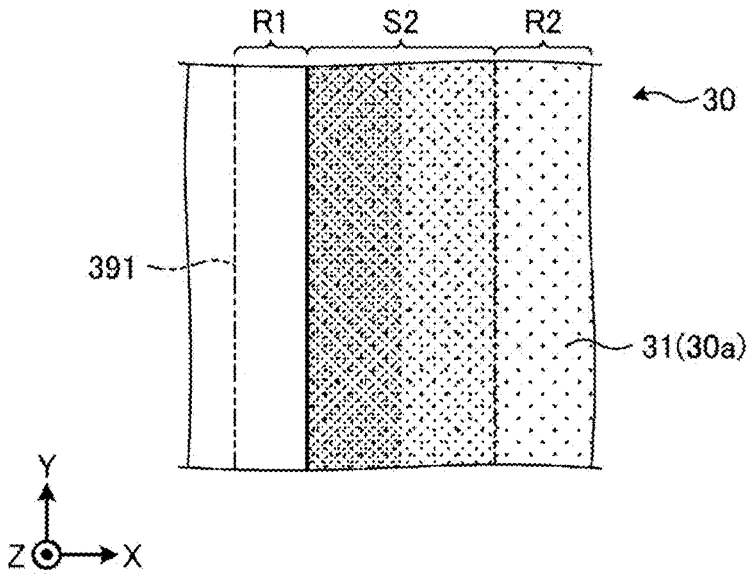
FIG. 15 is a plan view illustrating an example of the coating region coated by the coating method according to a tenth embodiment.

FIGS. 13 to 15 are plan views illustrating examples of the coating region coated by the coating method according to eighth to tenth embodiments. In the to-be-coated objects 30 illustrated in FIGS. 13 to 15, the second overlapping region S2 is positioned between the first region R1 and the second region R2 of the coating region 31 of the to-be-coated surface 30*a*. As illustrated in FIG. 13, the second overlapping region S2 may be coated by gradation coating having brightness increasing with distance from the edge 371. With the brightness being increased as the distance from the edge 371 increases, the boundary between the first region R1 to be coated in the first mode and the second region R2 to be coated in the second mode is even less visible, thereby further improving the coating quality. Such gradation coating may be performed, for example, in the first mode in which the first region R1 is coated, or may be performed in the second mode in which the second region R2 is coated. The gradation coating may be performed in both the first mode and the second mode.

As illustrated in FIG. 14, the second overlapping region S2 may be coated in the first mode together with the first region R1 when the first region R1 is coated by gradation coating (first gradation coating) having brightness increasing with distance from an edge 381. As illustrated in FIG. 15, the second overlapping region S2 may be coated in the second mode together with the second region R2 when the second region R2 is coated by gradation coating (second gradation coating) having brightness increasing with distance from an edge 391.

Each embodiment according to the present invention has been described above. However, the present invention is not limited to the above embodiments, and various variations can be made without departing from the essential spirit of the present invention. For example, in the embodiments described above, examples have been described in which the first mode and the second mode differ from each other in discharge rate only. However, the difference between modes is not limited thereto. For example, the droplets discharged from one discharge hole in the first mode may be smaller than the droplets discharged in the second mode. A size of the liquid droplets discharged from one discharge hole in the first mode may be smaller than a size of the liquid droplets discharged in the second mode.

As described above, in the coating method according to the embodiments, the coating region 31 on the to-be-coated surface 30*a* is coated using the head 10 including the plurality of nozzles 11 configured to discharge the liquid 50. The coating method includes performing coating in the first mode while moving the head 10 in the direction along the edge of the coating region 31, and performing coating in the second mode having a higher discharge rate than that of the first mode. The first region R1 including at least part of the edge is coated in the first mode. Thus, according to the coating method according to the embodiments, the coating quality is improved.

The coating device 1 according to the embodiments coats the coating region 31. The coating device 1 includes the head 10 including the plurality of nozzles 11 configured to discharge the liquid 50, and the controller 41 configured to control the discharge of the liquid 50 from the plurality of nozzles 11. The coating device 1 has the first mode in which coating is performed while moving the head 10 in the direction along the edge of the coating region 31 and the second mode having a higher discharge rate than that of the first mode. The controller 41 controls to coat the first region R1 including at least part of the edge of the coating region 31 in the first mode. Thus, according to the coating device 1 according to the embodiments, the coating quality is improved.

Further effects and variations can be readily derived by those skilled in the art. Accordingly, a wide variety of aspects of the present invention are not limited to the specific details and representative embodiments represented and described above. Accordingly, various changes can be made without departing from the spirit or scope of the general inventive concepts defined by the appended claims and their equivalents.

The invention claimed is:

1. A coating method for coating a coating region of a to-be-coated surface by using a head comprising a plurality of nozzles configured to discharge a liquid, the coating method comprising:

coating the coating region in a first mode while moving the head in a direction along an edge of the coating region; and coating the coating region in a second mode having a higher discharge rate than that of the first mode, wherein a first region comprising at least part of the edge is coated in the first mode, a second region located between the first region and a third region is coated in the second mode, the third region comprising at least part of the edge is coated in the first mode, a fourth region and a fifth region are regions in which the liquid is not discharged in the coating method, the first region is located between the second region and the fourth region, and the third region is located between the second region and the fifth region.

2. The coating method according to claim 1, wherein the second region does not include the edge.

3. The coating method according to claim 1, further comprising:

vibrating the liquid in a nozzle of the plurality of nozzles from which the liquid is not discharged in the first mode.

4. The coating method according to claim 1, wherein the liquid positioned in a nozzle of the plurality of nozzles not corresponding to the first region is discharged in the first mode.

5. The coating method according to claim 1, wherein in the first mode, first gradation coating having brightness increasing with distance from the edge is performed.

6. The coating method according to claim 5, wherein the first region includes a first overlapping region to be overlappedly coated in the first mode, and the first overlapping region is coated by the first gradation coating.

7. The coating method according to claim 6, wherein the first overlapping region is coated multiple times while moving the head in different directions.

8. The coating method according to claim 1, wherein in the second mode, second gradation coating having brightness increasing with distance from the edge is performed.

9. The coating method according to claim 8, wherein the coating region includes a second overlapping region to be overlappedly coated in the first mode and the second mode, and in the second mode, the second overlapping region is coated by the second gradation coating.

10. The coating method according to claim 9, wherein in the first mode, the second overlapping region is coated by first gradation coating having brightness increasing with distance from the edge.

11. The coating method according to claim 1, wherein an interval between the head configured to coat the coating region and the to-be-coated surface is 5 mm or greater.

12. The coating method according to claim 1, wherein in the first mode, coating is performed at a discharge rate of from 1% to 10%.

13. The coating method according to claim 1, wherein the first region and the third region do not overlap each other.

14. The coating method according to claim 1, wherein a sixth region comprising at least part of the edge is coated in the first mode, and in a first overlapping region, the first region and the sixth region overlap each other or the third region and the sixth region overlap each other.

* * * * *